United States Patent Office 3,335,068
Patented Aug. 8, 1967

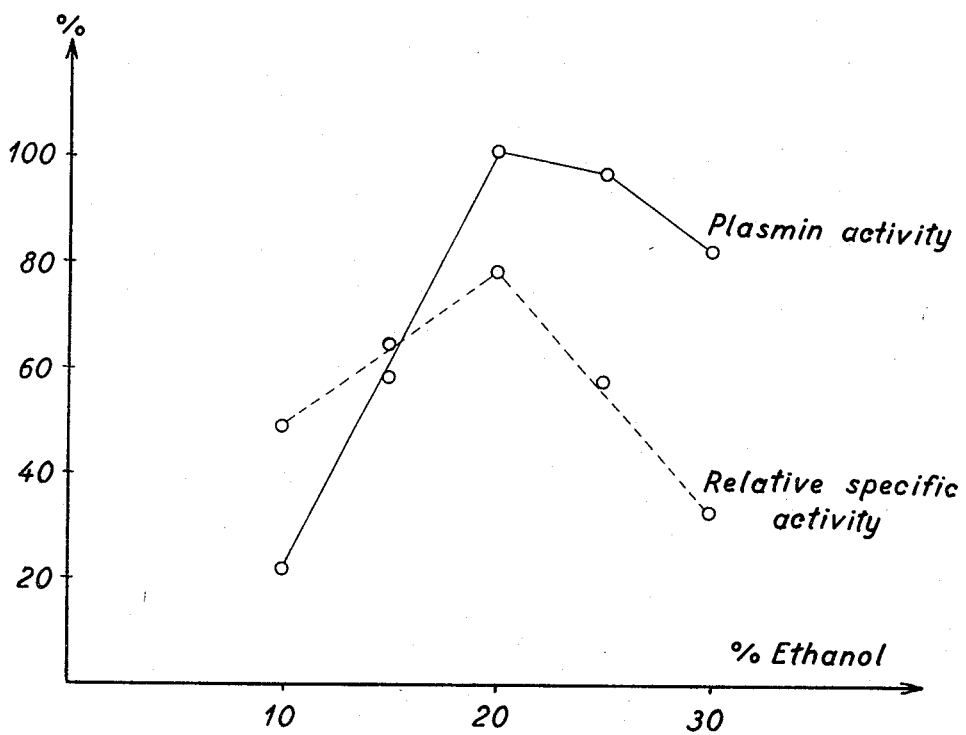

3,335,068
PROCESS IN THE RECOVERY OF PLASMINOGEN FROM A BLOOD COMPONENT OF MAMMALIAN ANIMALS
Villy Johannes Jensen, Vanlose, Denmark, assignor to Novo Terapeutisk Laboratorium A/S, Copenhagen, Denmark, a Danish company
Filed July 6, 1964, Ser. No. 380,488
Claims priority, application Denmark, July 22, 1963, 3,504/63; Oct. 29, 1963, 5,094/63
6 Claims. (Cl. 195—66)

ABSTRACT OF THE DISCLOSURE

Recovery of plasminogen from blood plasma or serum of animals (bovine or pig) at pH of 5 to 9 by precipitating with 10–60% organic solvent.

---

It is known to recover plasminogen from human blood serum by removing the fibrinogen content of the plasma and precipitation of the so-called euglobulin fraction from the resulting serum whereafter the euglobulin fraction is working up to plasminogen. The plasminogen may then be activated to plasmin by treatment with enzymes such as streptokinase, trypsin, or urokinase.

Some of the known methods for recovering plasminogen from human blood make use of a strong dilution of the serum after the fibrinogen has been removed whereafter an euglobulin fraction is precipitated at a specific pH-value and then worked up to plasminogen. It has also been found possible to recover an animal plasminogen which after activation to plasmin can be employed in the human clinic without appreciable risk of anaphylaxia or other harmful effects when animal serum or animal plasma, preferably from pig's blood, is diluted 5 to 8 times with water employing a pH value of 5 to 6, vide British Patent No. 1,013,507.

On account of the production drawbacks which the above dilution method involves, especially the use of comparatively large precipitation tanks, one has in accordance with the invention tried to find a method for the direct precipitation of animal plasminogen by which said drawback is avoided and there is obtained a high yield of plasminogen which after activation to plasmin possesses a clinical usefulness equally good as animal plasminogen which has been precipated by a dilution method.

The present invention is based upon the following experiments.

A series of portions of serum from pig's blood is prepared in the manner set forth in the following, each portion having a volume of 50 ml. To each portion of serum there is added carefully and with stirring a certain amount of 96 per cent ethanol. In this connection and throughout the following $n$ per cent of ethanol should be understood as $n$ ml. of 96 percent ethanol per 100 ml. of total volume, no regard being paid to changes in volume arising from the mixing process or from temperature changes. From the table below those amounts of 96 percent ethanol appear which must be added to 50 ml. of serum in order to obtain the percentages set forth.

| $n$ percent | 10 | 15 | 20 | 25 | 30 |
|---|---|---|---|---|---|
| Ml. of ethanol | 5.56 | 8.82 | 12.5 | 17.6 | 21.4 |

The pH value of the resulting mixture is then adjusted to a certain value. The precipitation solution is left overnight at a certain temperature whereafter the liquid is centrifugalized off at the same temperature as the one at which the precipitation is carried out. The precipitate is washed with 25 ml. of distilled water at a pH value of 5.5 and a temperature of 25° C. The supernatant liquid is discarded and the precipitate is dissolved in 25 ml. of dilute sulfuric acid at a pH value of 2 to 3. The plasmin activity and the total amount of organic matter contained (proteins and fats) are then determined.

After fixing at 100 as well the plasmin activity as the total amount of organic matter precipitated in an euglobulin precipitation at a pH value of 5.3 and 25° C. and a degree of dilution of 20 (with water) the plasmin content and the total amount of organic matter found by the above experiments are calculated in percent of these reference values. The degree of dilution means the ratio between the volume of the diluted precipitation solution and the volume of the employed amount of serum.

The experimental results are represented by the graphs shown in the drawing referring to a pH value of 6.0 and a temperature of 0° C. The abscissa shows the added percent amount of ethanol, vide the above definition, and the ordinate shows the percent values found for the plasmin activity and for the relative specific activity, i.e. 100 times the ratio between the plasmin activity expressed in percent and the content of total organic matter expressed in percent.

The full-drawn graph shows the relationship between the plasmin activity of the precipitated matter and the ethanol concentration, while the stippled line shows the relationship between the relative specific activity and the ethanol concentration. It appears from the graphs that under the temperature and pH conditions mentioned there is obtained a plasmin activity of practically 100 percent and a relative specific activity of about 80 percent by addition of such a relatively small amount of ethanol as 20 percent, calculated as described above. Corresponding sets of graphs which correspond to other pH values and other temperatures show that at pH values down to at least 5.0 and up to 8 to 9 and at temperatures within the interval from the freezing point of the employed solution to about room temperature satisfactory results can be obtained. It further appears from the graphs that in those instances in which a high yield is obtained the purity of the precipitated plasminogen is practically independent of the pH value and to some extent independent of the temperature, too.

In experiments using other organic solvents than ethanol it has been found that by employing for example methanol, acetone, or ether, there are also obtained excellent yields of plasminogen under conditions which correspond to those employed for ethanol. It seems that in the precipitation there may successfully be employed as well water miscible organic solvents as organic solvents being slightly miscible with water, including the commercial organic solvents of more complicated composition.

Experiments corresponding to the ones described above, but employing serum from ox blood instead of pig's serum have shown that in this instance, too, there can be obtained a good yield of plasminogen and a relatively high relative specific activity by precipitation with e.g. ethanol.

It has also been found that it is not necessary to separate the fibrinogen content from the employed plasma prior to the plasminogen precipitation, and that by omitting this step, i.e. by employing animal blood plasma as the starting material, there can also be obtained a plasminogen precipitate which after activation to plasmin possesses a satisfactory plasmin activity.

On the basis of the results of the above investigations the process of the invention is characteristic in that an organic solvent in an amount of at least 10 percent is added to the employed serum or plasma at a pH value of 5 to 9 at a temperature between the freezing-point of the mixture and about 15° C., whereafter the resulting precipitate which contains plasminogen is separated.

It is true that in literature there is disclosed a method in which plasminogen is precipitated from serum with a relatively small amount of ethanol, but in this instance the question partly is of recovery from human serum, partly of precipitation at an ionic strength of 0 to 0.05, and this means that prior to the precipitation there has necessarily been made use of a considerable dilution, cf. the ionic strength of about 0.16 for undiluted serum.

The euglobulin precipitate prepared by the present process may be worked up to plasminogen in a manner known per se and can then be activated to plasmin. On account of the fact that serum contains great amounts of inhibitors, it is necessary to wash the resulting precipitates free from supernatant liquid prior to the analysis. Even though this wash in the case of, for example, precipitation with ethanol might be carried out with mixtures of water and ethanol it is, however, preferred to wash with distilled water in order to avoid denaturing in an extra ethanol precipitation. It has been found that such washing with water results in practically no loss of plasminogen activity.

Although as already mentioned there may be employed a series of organic solvents in the present direct precipitation of plasminogen, it is according to the invention often most appropriate to employ ethanol as precipitant in practice.

Since the isoelectric point for recovery of plasminogen is at about pH=5.3 the smallest amount of ethanol is necessary when precipitating in the vicinity of said pH value. However, since at this pH value there is a certain tendency towards denaturing of the protein, it is easier to obtain a reproducible precipitation at a pH value of 6. Thus, according to the invention it is advantageous to carry out the precipitation at this degree of acidity. Furthermore, the temperature dependency of the yield is smallest at this pH value.

As regards the concentration of the employed organic solvent it is so that generally there can be obtained satisfactory plasminogen yields at concentrations of 10 to 30 percent, although there is no obstacle for using lower as well as considerably higher concentrations. However, the concentration of the organic solvent should be kept below those values at which there will be a tendency towards a complete precipitation of all of the compounds dissolved in the serum or plasma. Otherwise, the purifying effect of the precipitation will be decreased. Furthermore, the concentrations should not exceed such a value that the plasminogen will be considerably denatured. Thus, in accordance herewith it has been found that generally the organic solvent concentration should not be greater than about 60 percent.

In case there is employed a pH value of 6 when precipitating with ethanol as organic solvent, it is according to the invention especially appropriate to employ the ethanol in an amount of about 20 percent, calculated as defined above, since hereby there is obtained a high yield of plasminogen having a high relative specific activity. Furthermore, under these conditions of precipitation the temperature dependence of the yield is small, vide above, and, furthermore, the variations in yield resulting from chance alterations in pH value and ethanol concentration are relatively small at pH=6 and at the ethanol concentration mentioned.

The temperature range inside which the precipitation is carried out so far stretches from the freezing point of the employed solutions up to about 15° C. However, since in practice, for example, when using relatively low concentrations of organic precipitant, one may run the risk of partly freezing of the solutions at temperatures below about −10° C., and inasmuch as the best yields and the highest relative specific activity are generally obtained at temperatures below +5° C., it is according to the invention most advantageous to work at a temperature from −10 to +5° C.

The blood plasma and the blood serum used as starting materials in the following examples and in the experiments described above are prepared in the following manner: Immediately following the drawing off there is added to the blood a solution containing an anticoagulation agent and, if desired, one or more antibiotics, followed by cooling. The blood thus treated is centrifugalized and the blood corpuscles are removed whereby the blood plasma is left behind.

The serum is prepared by recalcifying the plasma by the addition of calcium chloride. The plasma is then left with vigorous stirring for some hours, whereby the fibrin is precipitated. The latter is separated, and the remaining serum is employed in those experiments in which serum is used as starting material.

In all of the experiments the employed organic solvent is cooled to the temperature at which the precipitation is carried out, while the serum is cooled to 0° C. in precipitations made at temperatures below or equal to 0° C. and to the precipitation temperature at temperatures above 0° C.

*Recovery of plasminogen from serum from pig's blood and ox blood*

EXAMPLE I

To 50 ml. of serum from pig's blood there is carefully added 20 percent ethanol with stirring (12.5 ml. of 96 percent ethanol, vide the above table). The pH value of the mixture is adjusted to 6.0 and the precipitation solution is left overnight at −5° C. The liquid is decanted off at this temperature, and the precipitate is washed with 25 ml. of distilled water at a pH value of 5.5 and 25° C. The supernatant liquid is discarded, and the remaining precipitate is dissolved in 25 ml. of dilute sulfuric acid at pH=2–3. The resulting solution is then analyzed to determine the total amount of organic matter and the plasmin activity of the precipitated plasminogen after activation, the values of these variables obtained by a corresponding euglobulin precipitation at a degree of dilution of 20, a pH value of 5.3, and a temperature of 25° C. being fixed at 100, whereafter the amounts found in the experiment are calculated in percent of the reference values.

In this manner there is found in the above example a plasmin activity of 107.5 percent, a content of organic matter of 129 percent, and a relative specific activity of $$\frac{107.5}{129} \cdot 100 = 83.7 \text{ percent}$$

Similarly, the results set forth in the following tables are obtained while employing as well serum from pig's blood as serum from ox blood, different organic solvents and different combinations of temperature, pH value, and concentration of precipitant.

TABLE I
[Precipitation of pig plasminogen with ethanol]

| Ex. No. | Temperature, °C. | pH | Percent ethanol | Percent plasmin activity | Percent organic matter | Relative specific activity |
|---|---|---|---|---|---|---|
| 2 | −10 | 5.0 | 15 | 93.5 | 101 | 92.5 |
| 3 | −10 | 5.0 | 20 | 90.5 | 118 | 76.6 |
| 4 | −10 | 6.0 | 20 | 103.3 | 126 | 82.0 |
| 5 | −10 | 7.0 | 20 | 99.2 | 112 | 88.5 |
| 6 | −10 | 8.0 | 25 | 46.7 | 111 | 42.1 |
| 7 | −10 | 9.0 | 25 | 22.8 | 87.1 | 26.2 |
| 8 | −5 | 5.0 | 15 | 97.7 | 103 | 94.5 |
| 9 | −5 | 6.0 | 20 | 107.5 | 129 | 83.7 |
| 10 | −5 | 7.0 | 25 | 88.7 | 116 | 76.5 |
| 11 | 0 | 5.0 | 15 | 79.2 | 72.6 | 109 |
| 12 | 0 | 6.0 | 20 | 99.5 | 121 | 82.5 |
| 13 | 0 | 7.0 | 25 | 73.6 | 92 | 80.0 |
| 14 | +5 | 5.0 | 15 | 74.8 | 73.8 | 101.4 |
| 15 | +5 | 6.0 | 20 | 98.1 | 100 | 98.1 |
| 16 | +10 | 5.0 | 15 | 70.4 | 130 | 54.0 |
| 17 | +10 | 6.0 | 20 | 60.4 | 99.9 | 60.5 |

The examples of precipitation of pig plasminogen with ethanol set forth in the above table I show that in a relatively broad temperature interval at a relatively low pH value (5 to 7) there are obtained as well a high plasmin activity as a limited precipitation of organic matter, i.e. a high relative specific activity, while at the higher pH values (8 to 9), cf. Examples 6 and 7, there is obtained practically the same amount of organic matter but a lower plasmin activity so that in these instances the relative specific activity becomes relatively low.

Furthermore, it appears from the table that in several instances the highest possible plasmin activities are obtained.

TABLE II
[Precipitation of ox plasminogen with ethanol]

| Ex. No. | Temperature, °C. | pH | Percent ethanol | Percent plasmin activity | Percent organic matter | Relative specific activity |
|---|---|---|---|---|---|---|
| 18 | −10 | 6.0 | 20 | 101.5 | 113.6 | 89.3 |
| 19 | −10 | 7.0 | 20 | 61.6 | 113.0 | 54.5 |
| 20 | 0 | 6.0 | 20 | 122.4 | 162.2 | 75.5 |

It appears from Examples 18–20 in Table II that there can also be obtained a high plasmin activity and a limited precipitation of organic matter, i.e. a high relative specific activity, by precipitation of plasminogen from ox serum wth ethanol.

TABLE III
[Precipitation of pig plasminogen with methanol, acetone, and ether]

| Example No. | Precipitant | Temperature, °C. | pH | Percent precipitant | Percent plasmin activity | Percent organic matter | Relative specific activity |
|---|---|---|---|---|---|---|---|
| 21 | Methanol | −5 | 6 | 20 | 96.0 | 123 | 78.2 |
| 22 | do | −5 | 6 | 25 | 95.2 | 158 | 60.2 |
| 23 | do | −10 | 7 | 20 | 49.3 | 99.6 | 49.5 |
| 24 | do | −10 | 7 | 25 | 105.6 | 204 | 51.8 |
| 25 | Acetone | −5 | 6 | 20 | 60.8 | 66.2 | 91.8 |
| 26 | do | −5 | 6 | 25 | 88.0 | 128 | 69.0 |
| 27 | do | −10 | 7 | 20 | 23.7 | 72.8 | 32.6 |
| 28 | do | −10 | 7 | 25 | 47.7 | 103.0 | 46.3 |
| 29 | Ether | −5 | 6 | 20 | 73.6 | 108 | 68.1 |
| 30 | do | −5 | 6 | 25 | 65.6 | 128 | 51.5 |

From the examples in Table III it appears that instead of using ethanol as precipitant there can be employed other organic solvents with equally good result, in this instance methanol, acetone, and ether. Thus, at a pH value of 6 and with 20 percent precipitant, cf. Examples 21, 25, and 29, there are obtained relatively high relative specific activities with all of the three organic solvents employed.

*Recovery of plasminogen from plasma from pig's blood*

EXAMPLE 31

15 percent ethanol (8.82 ml. of 96 percent ethanol) is carefully added to 50 ml. of plasma from pig's blood with stirring. The pH value of the mixture is adjusted to 5.0 and the precipitation solution is left overnight at −5° C. The liquid is drawn off by centrifugalization at this temperature and the precipitate is washed with 25 ml. of distilled water at pH=5.5 and 25° C. The supernatant liquid is discarded and the remaining precipitate is dissolved in 25 ml. of diluted sulfuric acid at pH=2–3. The resulting solution is then analyzed for determination of the total content of organic matter as well as the plasmin activity of the precipitated plasminogen after activation, fixing at 100 the values for these variables which are found by means of an euglobulin precipitation of serum at a degree of dilution of 20, a pH value of 5.3, and a temperature of 25° C., whereafter the amounts found by experiment are calculated as percentages of the reference values.

In the above example there is found in this manner a plasmin activity of 98.4 percent, a content of organic matter of 186 percent, and a relative specific activity of 98.4/186=52.9 percent.

Similarly, the results compiled in the following table are obtained with the employment of pig plasma, ethanol, and different combinations of temperature and pH value.

TABLE IV

| Ex. No. | Temperature, °C. | pH | Ethanol, percent | Plasmin activity, percent | Organic matter, percent | Relative specific activity |
|---|---|---|---|---|---|---|
| 32 | 0 | 6.0 | 15 | 76.5 | 120 | 63.8 |
| 33 | 0 | 6.0 | 20 | 87.9 | 126 | 69.8 |
| 34 | −5 | 7.0 | 25 | 64.5 | 156 | 41.4 |

It appears from the above examples that under conditions corresponding to those employed when precipitating from serum it is possible to precipitate a considerable amount of the plasmin activity directly from plasma.

What I claim is:

1. A process in the recovery of plasminogen from a blood component of mammalian animals, said component being selected from the group consisting of animal blood serum and animal blood plasma, said process comprising adding to said blood component at a pH value of 5 to 9 an organic solvent in an amount within the range of about 10 to about 60 percent and at a temperature between the freezing point of the resulting mixture and about 15° C. for precipitating from said blood component a composition containing plasminogen, and separating the resulting precipitate which contains plasminogen.

2. A process as defined in claim 1, in which the plasminogen is recovered from blood serum selected from the group consisting of serum from pig's blood and serum from bovine blood.

3. A process as defined in claim 1, in which the plasminogen is recovered from blood plasma selected from the group consisting of plasma from pig's blood and plasma from bovine blood.

4. A process in the recovery of plasminogen from a blood component of mammalian animals, said component being selected from the group consisting of animal blood serum and animal blood plasma, said process comprising adding to said blood component at a pH value of about 6 an organic solvent in an amount within the range of about 10 to about 60 percent and at a temperature between the freezing point of the resulting mixture and about 15° C. for precipitating from said blood component a composition containing plasminogen, and separating the resulting precipitate which contains plasminogen.

5. A process in the recovery of plasminogen from a blood component of mammalian animals, said component being selected from the group consisting of animal blood serum and animal blood plasma, said process comprising adding to said blood component at a pH value of 5 to 9 an organic solvent selected from the group consisting of methanol, ethanol, acetone and ether in an amount within the range of about 10 to about 60 percent and at a temperature between the freezing point of the resulting mixture and about 15° C. for precipitating from said blood component a composition containing plasminogen, and separating the resulting precipitate which contains plasminogen.

6. A process in the recovery of plasminogen from blood serum selected from the group consisting of serum from pig's blood and serum from bovine blood, said process comprising adding to the serum at a pH value of about 6 an organic solvent selected from the group consisting of methanol, ethanol, acetone and ether in an amount within the range of about 10 to about 30 percent and at a temperature between the freezing point of the resulting mixture and about 15° C. for precipitating from said blood component a composition containing plasminogen, and separating the resulting precipitate which contains plasminogen.

References Cited

UNITED STATES PATENTS 2,922,745  1/1960  Singher et al. _____ 167—65

OTHER REFERENCES

Cohn, E. J., et al., J.A.C.S., March 1946, vol. 68, pages 459 to 475.

A. LOUIS MONACELL, *Primary Examiner.*

L. M. SHAPIRO, *Assistant Examiner.*